T. BROWN.
MANURE SPREADER RAKE.
APPLICATION FILED DEC. 14, 1912.

1,187,033.

Patented June 13, 1916.
2 SHEETS—SHEET 1.

Witnesses
R. S. Gehr
Stanley R. Cook

Inventor
Theophilus Brown
By H. H. Bliss
Attorney

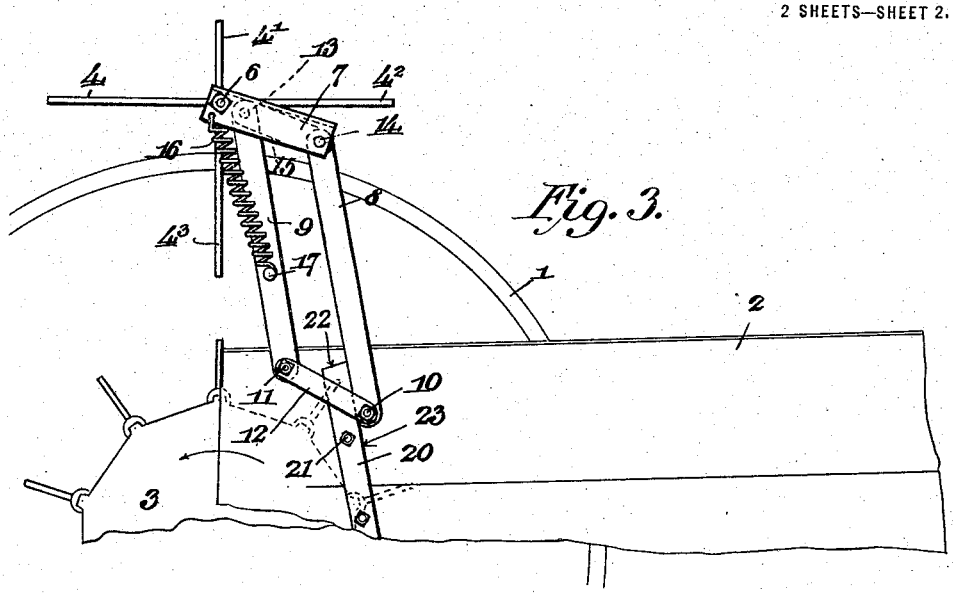
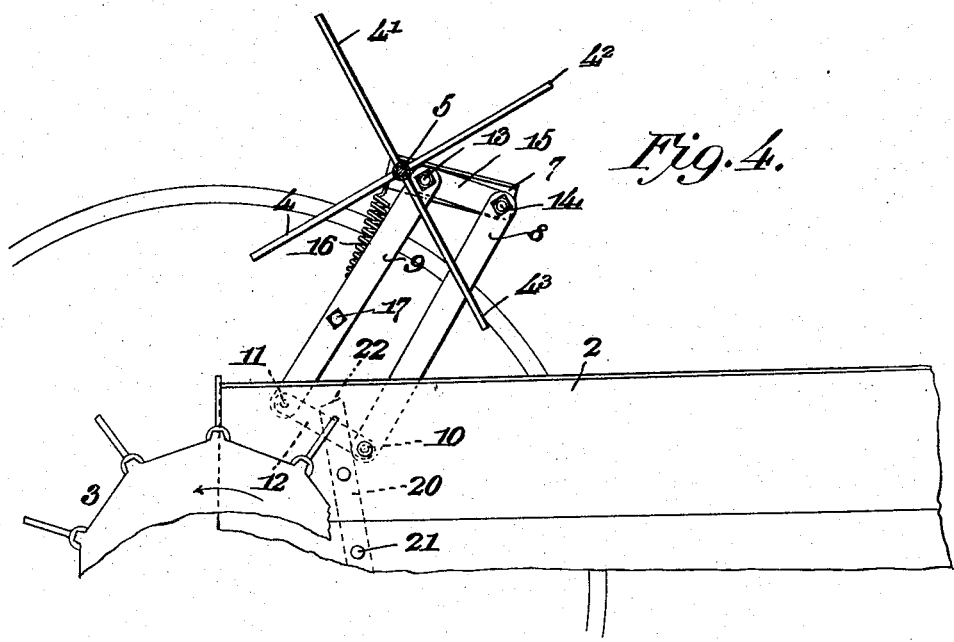

UNITED STATES PATENT OFFICE.

THEOPHILUS BROWN, OF MOLINE, ILLINOIS, ASSIGNOR TO MARSEILLES COMPANY, OF EAST MOLINE, ILLINOIS, A CORPORATION OF ILLINOIS.

MANURE-SPREADER RAKE.

1,187,033.  Specification of Letters Patent.  Patented June 13, 1916.

Application filed December 14, 1912. Serial No. 736,790.

*To all whom it may concern:*

Be it known that I, THEOPHILUS BROWN, a citizen of the United States, residing at Moline, in the county of Rock Island and State of Illinois, have invented certain new and useful Improvements in Manure-Spreader Rakes, of which the following is a specification, reference being had therein to the accompanying drawing.

This invention relates to improvements in rakes adapted to be placed in parallel relation to the rapidly rotating beater of a manure spreader and to co-act therewith. The purpose of the rake is to prevent large chunks of the material from being thrown rearward by the teeth of the beater and to insure the proper pulverizing and even distribution of the manure upon the ground.

The purpose of the improvement is to provide a raking device having a series of teeth or sets of teeth which co-act with the teeth of the beater in the way described and which will be moved exclusively under the pressure of the material of the load as the latter is being fed toward the cylinder, and which teeth or sets of teeth will be so moved under said pressure as to come into action successively; that is to say, one tooth or set of teeth coming into contact with the material as another set moves away therefrom. In the preferred form the raking device is made with a shaft or central carrier and a series of sets of fingers, the series extending around the axis and the fingers of the different sets being arranged in differing radial planes. The devices which support or hold and guide the rake are situated near the rear ends of the side boards of the machine.

Figure 1:
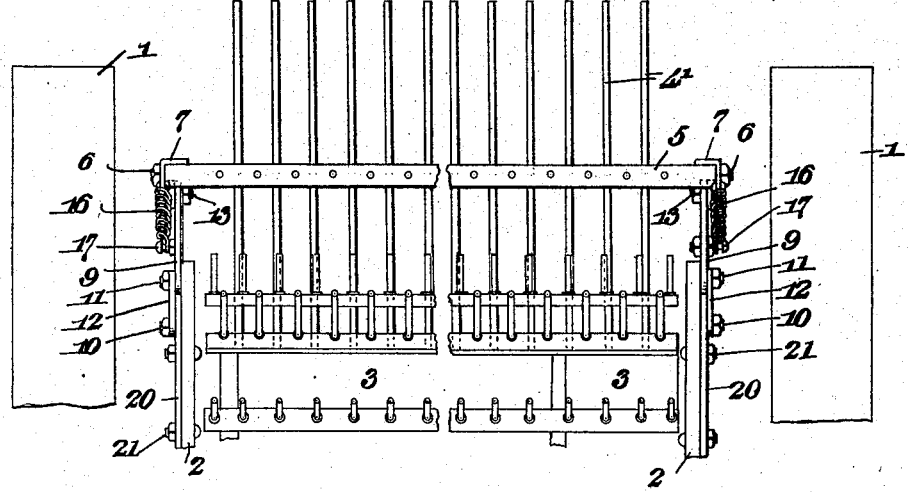
Figure 2:
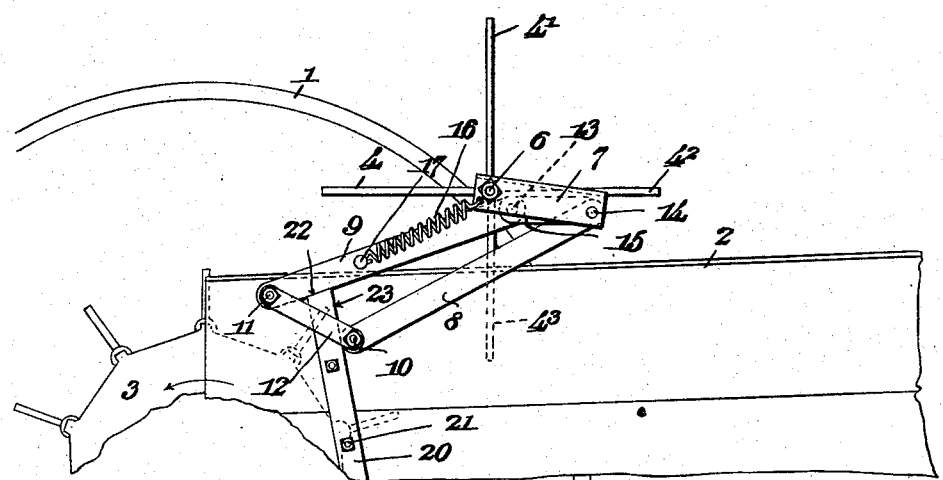

Referring to the drawings, Figure 1 is a rear elevation, the central part being broken away, of a manure spreader showing a rake embodying my improvements. Fig. 2 is a side view of the rear end of a manure spreader showing the rake in the same position that it is shown in Fig. 1. Fig. 3 is a side elevation with the rake positioned above the beater. Fig. 4 is a vertical longitudinal sectional view with the rake raised to points intermediate the positions shown in Figs. 2 and 3.

In the drawings, the two rear wheels of a manure spreader which support the rear end of the load-carrying body together with the distributing devices are indicated by the numerals 1—1. The sides 2 of the load-carrying body extend rearward to the beater which is driven from the rear axle and rotates rapidly in a direction opposed to that of the ground wheels, picking up and shredding particles from the rear end of the rearwardly moving load of manure and throwing them backward and downward upon the ground.

The rake comprises two series of rods extending through and secured at their centers to a transverse shaft 5. The rods are arranged in parallel rows in the transverse shaft 5 so as to form four sets of radially extending fingers 4, $4^1$, $4^2$, $4^3$, spaced 90° apart. The ends of the shaft are journaled upon pins 6 extending outward through the L-shaped brackets 7. A description of one of the rake supports applies equally well to both. Two arms 8 and 9 are pivoted upon bolts 10 and 11 at the side 2 of the vehicle. A strap 12 is secured at each end upon the bolts 10 and 11 and serves as a brace for the pivot pins. The bars 8 and 9 are of different length, the one at the rear being somewhat shorter than the other and the outer ends are pivoted by means of pins 13 and 14 to the link 15. The pin 14 connecting the longer arm 8 with the forward end of the strap link 15 likewise carries the forward extending end of the bracket 7. The bracket is L-shaped in section and is pivoted on the outer side of the link 15 and arm 8, being so arranged that its angular portion extends over the top of the two rods. A coiled spring 16 is secured at one end to the rear end of the bracket 7 adjacent the rotating shaft 5 and at the other end to pin 17 secured in the arm 9 near its pivoting bolt 11.

It is obvious from the description and drawings that the support for the rotating rake is somewhat in the nature of a parallel link construction and the rake is free to move upward and rearward under the pressure of the load. The springs 16 normally tend to hold the axis of the rake together with the brackets 7 downward against the upper edges of the strap links 15, the inward turned sides of the brackets 7 serving as stops to prevent the sliding of the brackets past the link. The pivoting of the brackets at their forward ends on the pins 14 allows the rake to have an upward movement independent of the parallel links, this movement being resisted by the action of the springs 16. The weight of the rake together with the links aided by the action of the springs tend to normally hold the rake in its downward and forward position where it acts as an end gate to prevent the manure being packed tightly around the beater during the operation of loading the body. On the rearward movement of the load the rake is moved upward and rearward allowing the material to come in contact with the rapidly rotating beater. The size and tension of the spring 16 will be governed by the weight of the parts above the pivots 10 and 11 and by the distance which the rake center at 6 is moved beyond the vertical transverse plane of the pivot 11. During the greater part of the distance through which the rake travels vertically, its gravity, together with that of the supporting parts, is an important agency in causing it to descend to its lowermost position, the spring acting as an additional agent in this work, and in bringing the center of gravity of the swinging structure back to the vertical plane of its hinging, in case it should be carried beyond such plane, as in moving from the positions in Fig. 4, to those in Fig. 3.

Braces 20 extend up the outer sides of the load-carrying body near the rear end. The upper ends of the braces extend up between the pivot pins 10 and 11, the lower ends being secured to the side sills and wagon body by bolts 21, 21. The upper portions of the braces are inclined rearwardly and the ends 22 beveled off so as to form a stop or bracket on which the arms 9 rest when in their lowered position. The braces are inclined rearward at such an angle that when the axis of the rake is directly above the beater axis the forward arms 8 will contact with the forward edges 23 of the braces, thus limiting the rearward movement of the rake.

One set of rake bars will be constantly in contact or embedded in the mass of material thereby preventing the free movement of the rake and allowing it to serve its purpose efficiently without a constant bobbing up and down as is oftentimes the case with the rakes which are now in use. As the load moves rearward it carries with it the embedded points of the rods until they are freed, and as the rods are arranged in series at 90° to each other a new set of rods will at that time be in contact with the material and ready to perform the functions of the rods about to be disconnected from the load. In this way new sets of rake teeth are being constantly presented for the shredding of the manure as it is forced upward by the teeth of the beater, and clogging and bunching of the material upon the ends of the rake teeth is prevented.

An advantage of this form of rotatable rake over others of either the power rotated or fixed-in-position sort is that the moving load does the work of positioning and slowly rotating the rake. As the rake at all times is in contact with the load, a hand adjustment for varying height of load is unnecessary and the rake positions itself automatically at its most efficient position. Having four sets of teeth it is impossible for the rake to obtain a greater motion than the movement of the load in which it is always embedded. The load is therefore retarded and permitted to go out in an even stream which is not the case where the cylinder is actuated faster than the movement of the load. Manure cannot accumulate in front of the rake until, as in the ordinary type of rake, the tension of the rake springs is overcome and then be thrown off in a bunch.

I am aware of the fact that power driven rotary rakes have been heretofore used or proposed; that is to say, rake devices each having a plurality of sets of fingers, those of each set being in a plane radial to the axis of the rake, together with driving devices (chains or the like) connecting the rake with some of the power transmitting parts of the mechanism. In my construction the raking mechanism is such that the sets of fingers are each freely movable to and from the lines of the load travel, and as they are in no way connected to the timed or power driven parts of the machine, they are free to be actuated exclusively by the advancing load material, and with movements that vary with the variations of the pressure from the load. The liability to strain or break the raking mechanism is practically eliminated, as there is no interference or conflict between the movements imparted thereto by the load and movements resulting from positive power application.

What I claim is:—

1. The combination of the beater, the body adapted to hold the material to be distributed and to have it fed therethrough to the beater, a series of sets of transversely arranged rake fingers, each finger being movable to and from the lines of load travel, and guide devices in which said fingers are rotatively mounted to permit the sets thereof to be successively situated with the operative ends of their fingers in contact with the load material, and permitting them to be moved relatively to the beater under the advance of the load with movements varying with the variations of pressure.

2. The combination of the beater, the body adapted to hold the material to be distributed and to have it fed therethrough to the beater, a series of sets of transversely arranged rake fingers, each finger being movable to and from the lines of load travel, and guide devices in which said fingers are rotatively mounted to permit the sets thereof to be successively situated with the operative ends of the teeth in contact with the load material, and permitting said ends of the teeth to be moved on the advance of the load to and from the lines of load travel, and permitting the teeth to be bodily moved by said advance with motions varying with the variations of the pressure.

3. The combination of the body, the beater, a bodily rising and falling rotary rake rotating freely on its axis and having a plurality of sets of fingers respectively situated in different radial planes, and rake guiding devices permitting it to be situated with the lower ends of some of said teeth in contact with the material of a load, and permitting it to be rotated around its axis under the backward pressure of the load, and to rise under said pressure.

4. The combination of the body, the beater, a rake rotating freely on its axis in either direction and having a plurality of sets of fingers respectively situated in different radial planes, and rake guiding devices permitting it to be situated with the lower ends of some of said fingers in contact with the material of a load, and permitting it to be rotated on its axis under the pressure of the load and to be bodily moved by said pressure backward relatively to the beater.

5. The combination of the body, the beater, a rotary rake rotating freely on its axis and having a series of sets of fingers distributed in radial planes around said axis, and holding and guiding devices for the rake adapted to permit it to rise and fall relatively to the beater and arranged to hold it with the lower ends of some of said fingers in contact directly with the load material and in position to yield upward under the pressure of the load as it is forced toward the cylinder.

6. The combination of the body, the beater, the bodily movable rotating rake having two or more series of rotary rake fingers, the supporting and guiding devices for the rake arranged substantially as set forth to hold it, when in its lowermost position, in front of the upper part of the cylinder and to directly contact with the load and permit it to be pushed upward by the load while the rake is revolving, and means for bringing it automatically from its uppermost to its lowermost position while the fingers contact directly with the load material.

7. The combination in a manure spreader of a load-carrying body, a rapidly rotated distributing beater, a rake shaft, rake teeth radiating from said shaft, supports pivoted to the said body, and brackets pivoted to the forward ends of the supports, the rake shaft being rotatably carried by the said brackets.

8. The combination in a manure spreader of a load-carrying body, a rapidly rotated distributing beater, a rake comprising a transverse shaft and four sets of radiating teeth secured to the shaft at 90° to each other, brackets carrying said shaft rotatably in their rear ends, and link connections between the forward ends of the said brackets and the sides of the load-carrying body at points in the rear of the shaft.

9. The combination in a manure spreader of a load-carrying body, a rapidly rotated distributing beater, a rake comprising a transverse shaft and rake teeth radiating therefrom, brackets carrying the said shaft rotatably in their rear ends, link connections between the forward ends of the said brackets and the sides of the load-carrying body at points in the rear of the shaft, and resilient means for resisting the upward motion of the said rake shaft.

10. The combination in a manure spreader of a load-carrying body, a rapidly rotated distributing beater, a rake comprising a transverse shaft, and rake teeth radiating therefrom, brackets carrying the said shaft rotatably in their rear ends, link connections between the forward ends of the said brackets and the sides of the body at points in the rear of the shaft, and a spring connecting the ends of the said shaft and the said link connections.

11. The combination in a manure spreader of a load-carrying body, a rapidly rotated distributing beater, a pulverizing rake comprising a shaft and radiating rake teeth, link connections between the ends of the said shaft and the body, each of the said connections comprising two arms pivoted at their rear ends to the body, a strap link pivotally connecting their forward ends, supports L-shaped in cross section pivoted at their forward ends to the forward extending arm and so disposed that one leg of the L extends over the said strap link, and a bearing in the rear end of the bracket for supporting one end of the rake shaft.

12. The combination in a manure spreader of a load-carrying body, a rapidly rotated distributing beater, a rake comprising a shaft and radiating teeth, link connections between the ends of the said shaft and the body, each of the said connections comprising two arms pivoted at their rear ends to the body, a strap link pivotally connecting their forward ends, supports L-shaped in cross section pivoted at their forward ends to the forward extending arm and so disposed that one leg of the L extends over the said strap link, a bearing in the rear end of the bracket for supporting one end of the rake shaft, and a spring connecting the rear end of the said bracket and one of the said arms intermediate its ends.

In testimony whereof I affix my signature, in presence of two witnesses.

THEOPHILUS BROWN.

Witnesses:
JOHN HEVICH,
B. F. GOULD.

Copies of this patent may be obtained for five cents each, by addressing the "Commissioner of Patents, Washington, D. C."